UNITED STATES PATENT OFFICE.

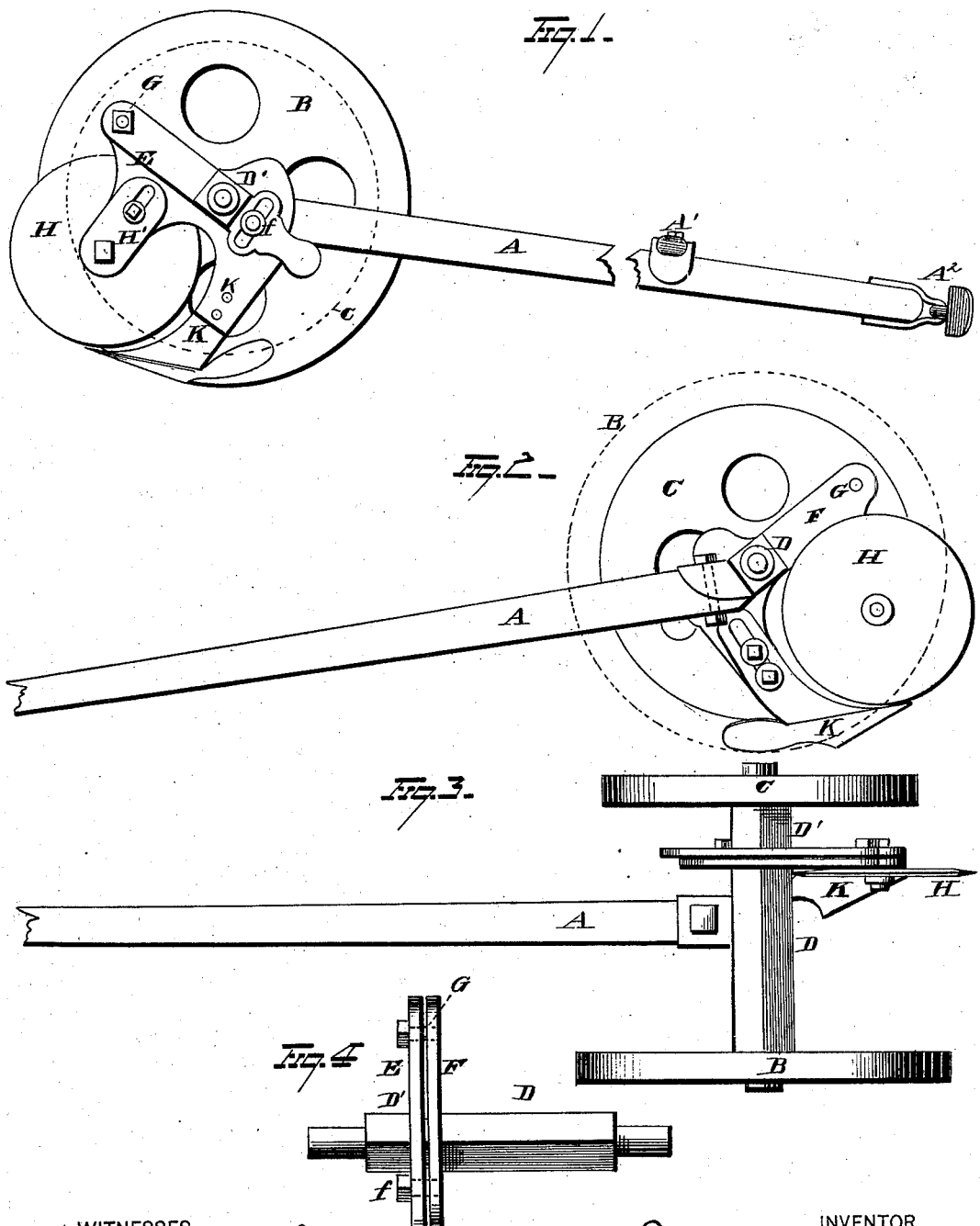

HORACE D. EDDY, OF GLENVILLE, OHIO, ASSIGNOR OF ONE-HALF HIS RIGHT TO ROBERT FOSTER, OF SAME PLACE.

IMPROVEMENT IN SOD-TRIMMERS.

Specification forming part of Letters Patent No. 214,496, dated April 22, 1879; application filed December 31, 1878.

*To all whom it may concern:*

Be it known that I, HORACE D. EDDY, of Glenville, in the county of Cuyahoga and State of Ohio, have invented certain new and useful Improvements in Sod-Trimmers or Walk-Edgers; and I do hereby declare the following to be a full, clear, and exact description of the invention, such as will enable others skilled in the art to which it pertains to make and use it, reference being had to the accompanying drawings, which form part of this specification.

My invention relates to a machine for trimming the sod on the border of walks or roads, and may be adapted for use either by hand or horse power.

My invention consists of a wheel colter and plow suspended between two wheels of unequal size, the plow adjustable longitudinally, as also is the smaller wheel, so that the device may be adapted to cut the border of walks or roads at different depths, as required, the same being constructed as hereinafter described and claimed.

In the drawings, Figure 1 is a view, in side elevation, of my device with the smaller wheel removed to show more clearly the parts. Fig. 2 is a view, in side elevation, with the larger wheel removed. Fig. 3 is a plan view of my device. Fig. 4 is a detached view of the axle, showing its compound character.

A is a pole or tongue by which the machine is drawn or driven. $A^1$ is an adjustable handle attached to pole A; $A^2$, an automatically-adjustable breast-plate attached to the end of the pole A, against which the operator can rest his body and assist in driving the machine.

The breast-plate $A^2$ may either have a hinge or swivel joint, or in any manner be adapted to accommodate itself to the body of the operator in any position.

B is the greater wheel, and C the lesser wheel, of my device, the former intended to run upon the road or walk, and the latter upon the sod. The relative position of the wheels B C is made adjustable by a compound axle composed of the two parts D and D'.

To the adjoining ends of the parts D and D' are attached arms or plates E F, hinged or pivoted together at a suitable distance from the axes of the axles D and D', substantially as shown at G in the drawings.

To the plate E is attached the wheel-colter H, although I do not limit myself to this description of colter, as any other appropriate kind of cutter may be substituted. This colter is fixed to an arm, H', which is adjustably attached to the plate E, whereby it may be fixed in any desired position.

To the plate E is adjustably attached the plow K. This adjustability of the plow enables this part of the device to be adapted to cut the required depth, which varies according to the thickness of the sod, &c.

The arms or plates E F are adjustably connected and attached by the slot and set-screw arrangement *f*. By this provision the relative position of the wheels B C may be adjusted.

By the adjustable attachment of the plow to its plate, and also by the adjustable connection of the plates E and F, it will be apparent that the range of adjustment, and consequent operation and utility, of my device is materially increased.

The entire arrangement of parts, as shown in the drawings, indicates that the form of device as herein specified is such as is intended to be pushed or driven by the operator.

I do not necessarily limit myself to this special form, as the pole or tongue A, instead of projecting from the rear of the machine, may project from the front thereof, and be adapted for the attachment of a horse or horses when the machine is made large enough, as it may be, to require horse-power to operate it. Neither do I limit myself to a machine of this character having wheels of unequal size. Owing to the adjustable features of my device, wheels of the same size may be used.

Having thus described my invention, what I claim as new, and desire to secure by Letters Patent, is—

1. In a sod-trimmer, the combination, with one of the axle-adjusting plates, of the plow connected therewith, and adapted to be adjusted vertically with reference to said plate, substantially as set forth.

2. In a sod-trimmer, the combination, with one of the axle-adjusting plates, of the plow-colter connected therewith, and adapted to be adjusted vertically with reference to said plate, substantially as set forth.

3. In a sod-trimmer, the combination, with the two-part axle, of the adjusting-plates respectively secured to each axle part, said plates, one or both, being provided with a plow and rotary colter, connected therewith in a manner whereby they may be vertically adjusted, substantially as set forth.

In testimony whereof I have signed my name to this specification in the presence of two subscribing witnesses.

HORACE D. EDDY.

Witnesses:
 JNO. CROWELL, Jr.,
 WILLIAM E. DONNELLY.